United States Patent Office 3,759,667
Patented Sept. 18, 1973

3,759,667
APPARATUS FOR ASPIRATING PRECISE VOLUMES OF FLUID SAMPLE
John D. Bannister, Dover, Mass., Frederick L. Coller, Ann Arbor, Mich., and Italo J. De Santis, Medway, Mass., assignors to Damon Corporation, Needham Heights, Mass.
Filed Oct. 22, 1971, Ser. No. 191,722
Int. Cl. G01n 1/14, 1/16
U.S. Cl. 23—259
9 Claims

ABSTRACT OF THE DISCLOSURE

Apparatus for aspirating a predetermined volume of liquid sample from a container into an intake conduit, together with a quantity of diluent having predetermined volumetric ratio to the sample volume. A vertically reciprocable sampling probe is programmed to aspirate sample until the leading edge of the sample reaches a sensor in the conduit defining the precise volume. The sampler is then reciprocated into a diluent chamber and aspirates diluent for a preset time. Thereafter the sampler moves into air and aspirates an air volume equal to the sample volume. The probe is then reinserated in the diluent, again for the preset time and thereafter again aspirates the precise volume of air. In the final step the sampler is again inserted into the diluent chamber to aspirate diluent until the leading edge of the sample reaches a second sensor positioned to define a volume between it and the sampler orifice, such that the diluent aspirated has a known ratio to the precise volume of sample. A downstream air intake is actuated each time the sampler is moved into air to insert sufficient air ahead of the fluid column to prevent undue acceleration of the fluids in the conduit.

FIELD OF THE INVENTION

This invention relates in general to analyzer instruments for determining the concentration of selected constituents in biological liquids and more particularly for aspirating from a sample container a precise quantity of sample liquid and thereafter aspirating a quantity of diluent bearing a specific volumetric ratio to the volume of sample aspirated and transmitting both fluids through a conduit to reaction vessels.

BACKGROUND OF THE INVENTION

The technique and appaartus of the present invention is useful in aspirating, through an input probe a precisely measured volume of biological sample to be supplied, for example, through a conduit to an analyzer instrument for the determination of the concentration of selected constituents. The technique and apparatus also provides for the aspiration through the same probe of a measured volume of diluent to provide a precise dilution ratio and for the supplying of this diluent through the same conduit to the analyzer. Automated equipment for introducing a sample of biological liquid such as blood serum, from each of a succession of liquid containers into a conduit for delivery to an automated analysis machine is well known. In such analyzers, fractions of the diluted sample are mixed in separate mixing volumes with selected reagents to perform chemical tests for identifying the concentration of selected constituents in the sample. A variety of different techniques or modes of operation of such machines have been developed. One such machine is essentially a continuous flow machine in which the aspirated sample and diluents are intermixed while the fluids are flowing under the influence of a proportional pump and the selected reagents are pumped into the flowing diluted samples by the action of the same pump with the ultimately reacted materials being supplied to a suitable reaction detector, such as a colorimeter for color sensitive reactions.

Another technique which has been employed in such machines calls for batch processing, in which the serum sample is aspirated from a container presented to the machine and subsequently introduced, along with appropriate quantities of diluent into a reaction vessel, to which reagent is supplied for performing the chemical analysis.

There is described in pending application Ser. No. 105,805, Jan. 12, 1971, assigned to the assignee of this present application, a biological fluid analysis system which differs somewhat from both of the above mentioned techniques. In the described biological fluid analysis system, a sample is aspirated into an input probe through the action of a proportional pump which continuously provides a sub-atomspheric pressure within a conduit. Immediately after the aspiration of the sample, suitable quantities of diluent are aspirated through the same sample probe into the input conduit. These fluids are then passed along the conduit through a simple splitting section which divides the fluid into a number of aliquots and thereafter the aliquots are passed through the proportional pump into a discharge section where the fluid fractions are discharged into a series of separated reaction vessels for measurement of selected constituents. When one such sample has been processed through the input probe and the conduit of this intake section, air is pumped through section, under the influence of the proportional pump, to clear the entire probe and conduit prior to the aspiration of a sample from the next container of the sequential series being presented to the machine.

There are a number of factors which affect the quality and performance of biological fluid analysis machines of any of the above types. One such problem is the requirement that there be substantially no contamination between successive samples analyzed by the machine. Another requirement is that the processing speed for an individual sample and hence for a series of samples be high, since the volume of samples which may be processed is an important factor of merit of the machine. Another problem associated with machines of the above type is the requirement that the volumetric ratio between the aspirated sample and the diluent be precise maintained so that the concentration of a particular constituent in the biological sample being analyzed can be correctly related to the absolute standards.

BRIEF SUMMARY OF THE INVENTION

Broadly speaking, the present invention is an improvement to the blood analysis apparatus described in pending application Ser. No. 105,805, now abandoned. In the present invention a method and apparatus for aspirating a serum sample followed by increments of diluent in precise volumetric ratio to the volume of the sample is taught. The invention includes an aspirating probe vertically reciprocable from a lowermost position in which serum is aspirated through its tip to an uppermost position in which diluent is aspirated and thereafter to an intermediate position in which air is aspirated. The aspiration sequence is such that an initial volume of serum is aspirated, immediately followed by an increment of diluent. Thereafter an increment of air followed by a second increment of diluent, another increment of air and a final increment of diluent is aspirated into the probe and flowed along the conduit under the influence of the subatmospheric pressure provided by the continuous operation of a proportional pump. The resultant column of fluid includes a measured volume of sample followed immediately by a roughly measured volume of diluent, then two successive increments of diluent separated from the first section and from each other by precisely measured volumes of air, the total volume of diluent plus air also being precisely measured. This column of fluids is passed along a conduit, through a vertical mixing stage and into an aliquot splitting section. The dimensions of the aliquot splitting are such that each of the increments is separately split and thereafter the separate fractions are passed through the pump and delivered to reaction vessels or test tubes. Each cycle includes one such column and the second sequential sample is not introduced into the input probe until all of the sample and diluent materials from the preceding sample, have been emptied into the reaction vessels.

A first sensor, capable of detecting the interface between either the diluent fluid and air or the serum and air is positioned on the conduit at a distance from the tip of the probe such that the precise volume of sample to be aspirated is contained in the probe and conduit to that point. A second sensor is positioned further along the tubing nearer the output end of this intake section, the volume between it and the probe tip being equal precisely to the total volume of sample, air and diluent called for by the correct volumetric ratio of diluent and sample. Signals from these sensors together with signals from a timing device are used to control the movement of the aspirating probe into any one of its three positions and thereby to control with high precision the volumetric ratio between the aspirated serum and the aspirated diluent. It is important both for the purpose of measuring the volumetric ratios and for the purpose of accurately splitting the initial mixture of sample and diluent as well as the subsequent increments of diluent, that the integrity of the fluid sections in the column be preserved. In order to preserve this integrity, it is necessary to restrain the acceleration of any of the sections below that at which turbulent flow and therefore break up of the fluid sections will occur. Yet, it is, as mentioned above, highly desirable to process the individual samples as rapidly as possible.

One problem encountered in maintaining the acceleration below an acceptable level arises from the change in velocity of fluids under the influence of the continuous action of the pump, when the probe end moves from a position in which it is aspirating relatively heavy fluid to the position where it is aspirating air. In order to counteract the acceleration which would normally be experienced at this point of the operation, a controlled pulse of air pressure is introduced into the input tubing at a point downstream from the leading edge of the sample but prior to the aliquot splitting section. This air provides a back pressure, timed to coincide with the change in the aspirating fluid from liquid to air thus preventing acceleration of the fluid and preserving the integrity of the individual fluid sections. With this arrangement pumping speeds greatly in excess of those which could be tolerated without such as controlled back pressure technique are achievable.

DESCRIPTION OF PREFERRED EMBODIMENTS

Figure 1:
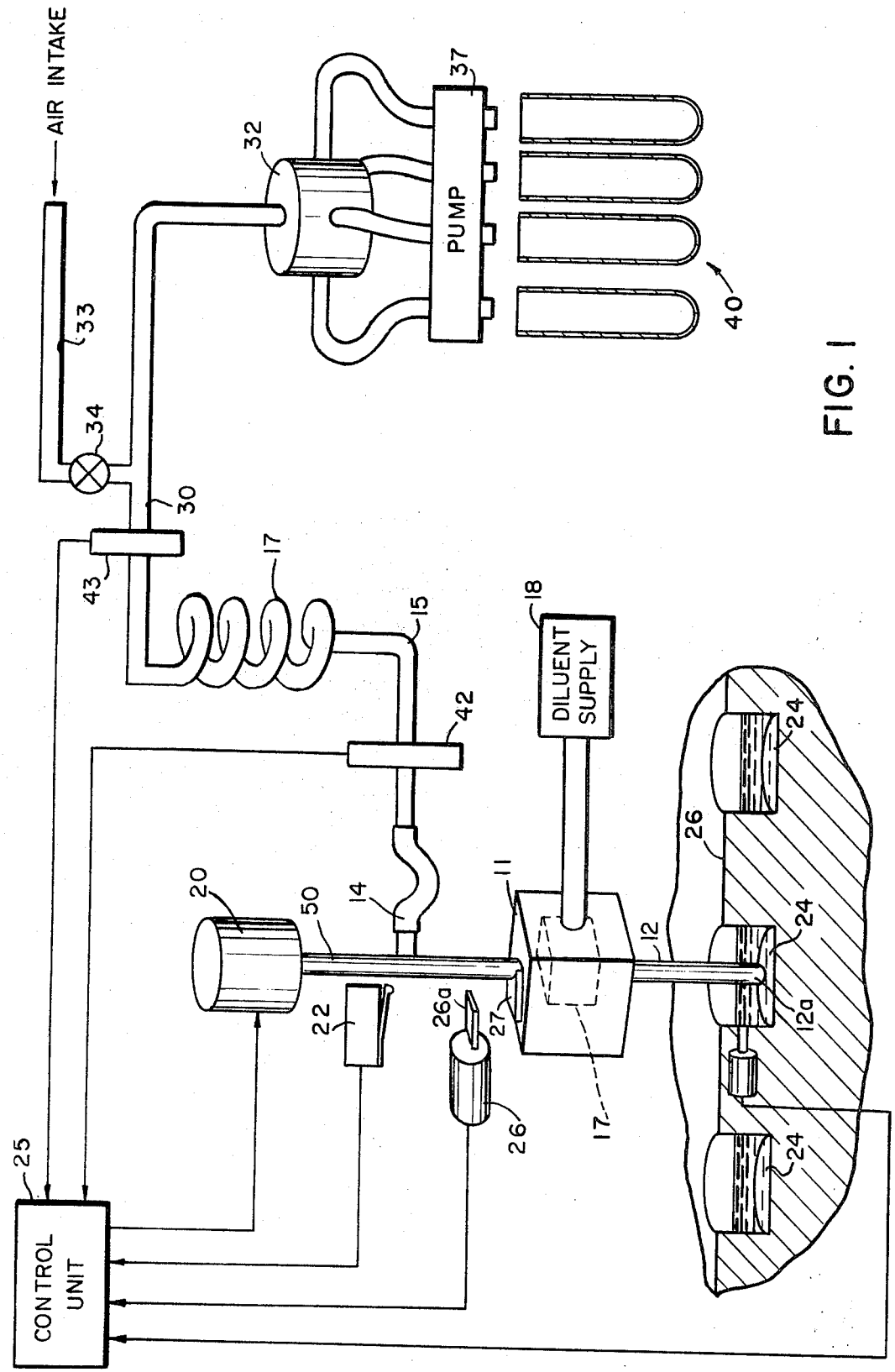
FIG. 1 is an illustration, generally in diagrammatic form, of the fluid input and sampling section of a blood analysis machine constructed in accordance with the principles of this invention.

With reference now to FIG. 1, there is illustrated the intake section of a blood analysis machine generally of the type described in pending patent application Ser. No. 105,805. This section includes a sampler 11 having an aspirating probe 12 with an intake tip 12a. The aspirating probe is a hollow tube extending from the tip 12a to a flexible tubing 14 which joins the probe to an intake conduit 15. The sampler 11 includes a diluent chamber 17 which is supplied with diluent from diluent supply 18. The probe 12 is mounted for vertically reciprocable movement under the control of a pneumatic actuator 20. When the pneumatic actuator 20 is energized, the probe 12 will be in an uppermost position with its tip 12a within the diluent chamber 17 and, in this position, it will actuate a limit microswitch 22, the latter providing an output signal to a control unit 25. When the pneumatic actuator 20 is not energized the probe 12 will be either in its lowermost position within one of series of sample containers 24, or will be in an intermediate position with its tip 12a in air. When the actuator 20 is not energized, the position of the probe 12 is determined by the state of energization of a stop solenoid 26 which includes an extending arm 26a. When the solenoid is not energized the arm 26a is biased out into the bath of an extending arm 27 attached to the probe 12 and thus arrests its downward motion. Energization of the solenoid 26, however, withdraws this arm 26a from the path of the probe, allowing the tip 12a of the probe to extend all the way into the fluid sample within the cup 24.

It will be understood that the cups 24 are normally carried on a conveyor 26 to a position under the samples probe 12 under the influence of an incrementing motor (not shown). A sensing switch 29 provides an output signal to control unit 25, signaling whether a sample container is in position under the sampler probe 12.

The intake conduit 15 terminates in a vertically oriented mixing coil 17 which is, in turn, coupled through tubing 30 to an aliquot splitting chamber 32. An air intake tube 33 allows a pulse of air to be injected into line 30 by operation of the valve 34 under the influence of control unit 25. The splitting chamber 32 divides the input fluids supplied through tubing 30 into a number of fractions, here illustrated as four, which pass through pump 37 and are discharged into separate reaction vessels 40. The pump 37 is usually of the proportional type and is continuously operated to provide continuous subatmospheric pressure within the intake section. Once the fluids passed through the sampler and the splitting chamber 32 are discharged into the reaction vessels 40, separate analysis procedures for determining the quantity of specific constituents in the fluid may be carried out in the manner taught in the pending application Ser. No. 105,805.

A fluid sensor 42 is located on the tubing section 15 preceding the mixing coil 17 and a second fluid sensor 43 is positioned on the tubing 30, prior to the junction with the air intake 33. Each of these fluid sensors is adapted to sense an air-fluid interface and to provide an output signal whenever there is a change from air to fluid or from fluid to air. Any suitable sensors may be employed, for example, conductivity cells or optical sensors. The output signals from these sensors 42 and 43 are supplied to control unit 25.

Operationally, the apparatus functions to aspirate a precise quantity of liquid from each sample container 24 presented to it and to transmit this sample, together with a quantity of diluent having a precise volumetric ratio to the volume of sample, to the splitting chamber 32 and to provide precise fractions of this sample and diluent in the proper volumetric ratio to a series of reaction chambers 40. Additional requirements of this apparatus are that there not be contamination from one sample to the next and that the samples be processed as rapidly as possible. It has been discovered that both of these additional requirements may be met by operating the probe such that an initial measured volume of sample is aspirated, followed immediately by a measured quantity of diluent, with these two increments being allowed to mix in the mixing coil 17. The diluent segment does not constitute all of the diluent needed to obtain the proper ratio, but rather two additional incrmenets of diluent, separated from the first increment and from each other by small segments of air are aspirated into the probe 12 and follow the initial quantity of sample and diluent along the conduit 15 and tubing 30. Utilizing this arrangement, not only can the volumetric ratios be precisely controlled, but also the internal surfaces of the sampler and tubing are cleansed sufficiently to prevent contamination from one sample to the next. As will be pointed out in more detail below, the entire sequence may be operated rapidly if pulses of air are bled into the tubing 30 through air intake 33 and valve 34 at appropriate intervals to prevent undue acceleration of the train of fluids as they flow along the tubing.

Figure 2:
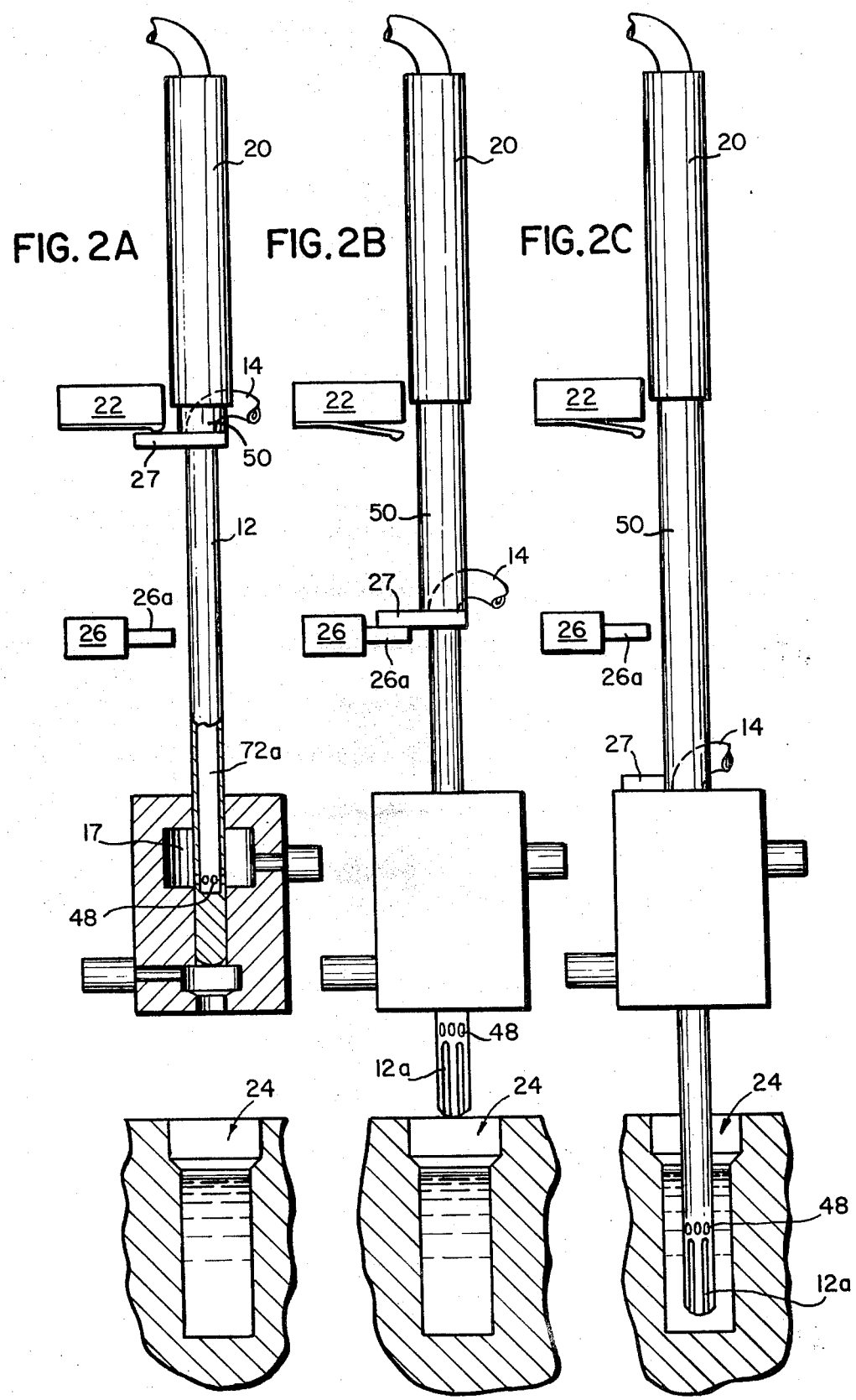
FIGS. 2a, 2b and 2c are illustrations generally in perspective view of a fluid aspirating probe suitable for use in the apparatus illustrated in FIG. 1.

The particular sequence of sample, diluent and air aspirated into the input section and flowed to the splitting chamber 32 is controlled by the movement of the probe 12. The proportional pump 37 is operated continuously producing subatmospheric pressure within probe 12 and causing the probe tip 12a to suck continuously. In FIGS. 2a, 2b and 2c details of the probe construction are illustrated, with the probe in its uppermost position in FIG. 2a, in its intermediate position in FIG. 2b and in its lowermost position in FIG. 2c. The diluent chamber 17 within the sampler 11 has diluent supplied to it through input port 45 and the residue of the diluent is discharged from the chamber 17 through port 46. The probe tip 12a has perforations 48 around its periphery to allow fluids, either the serum in cup 24 or the diluent from the chamber 17 to be aspirated into the body of the probe 12 and pass out through the flexible coupling 14. The probe is supported on the extendable portion 50 of a pneumatic actuator 20 and, as shown in FIG. 2a, in its uppermost position a projecting arm 27 contacts microswitch 22, which indicates that the sampling probe 12 is in its uppermost position.

A more detailed description of the sampler is set forth in pending U.S. patent application Ser. No. 105,803.

In FIG. 2b the probe is shown in the intermediate position in which air is aspirated. In this position the pneumatic actuator 20 is deenergized, allowing the extendable portion 50 to descend, its downward travel being interrupted by arm 26a of solenoid 26. In this intermediate position the openings 48 in probe tip 12a are in air intermediate the sampling block 11 and the sample container 24. The pneumatic actuator 20 may take any convenient form, several solenoid operated, air actuated cylinders being available. In general, however, upon actuation it should retract the extendable portion 50, which when the cylinder is not actuated, is biased into its lowermost position by the action of a spring or the like.

The probe 12 is shown in its lowermost position in FIG. 2c in which the probe tip 12a is immersed within the serum sample in container 24. In order to allow the actuator portion 50 and probe 12 to extend to this lowermost position the stop arm 26a of solenoid 26 has to be withdrawn, thereby permitting the projecting arm 27 of the probe 12 to pass below the position of solenoid 26 and come to rest on the top of the sampler 11.

Figure 3:
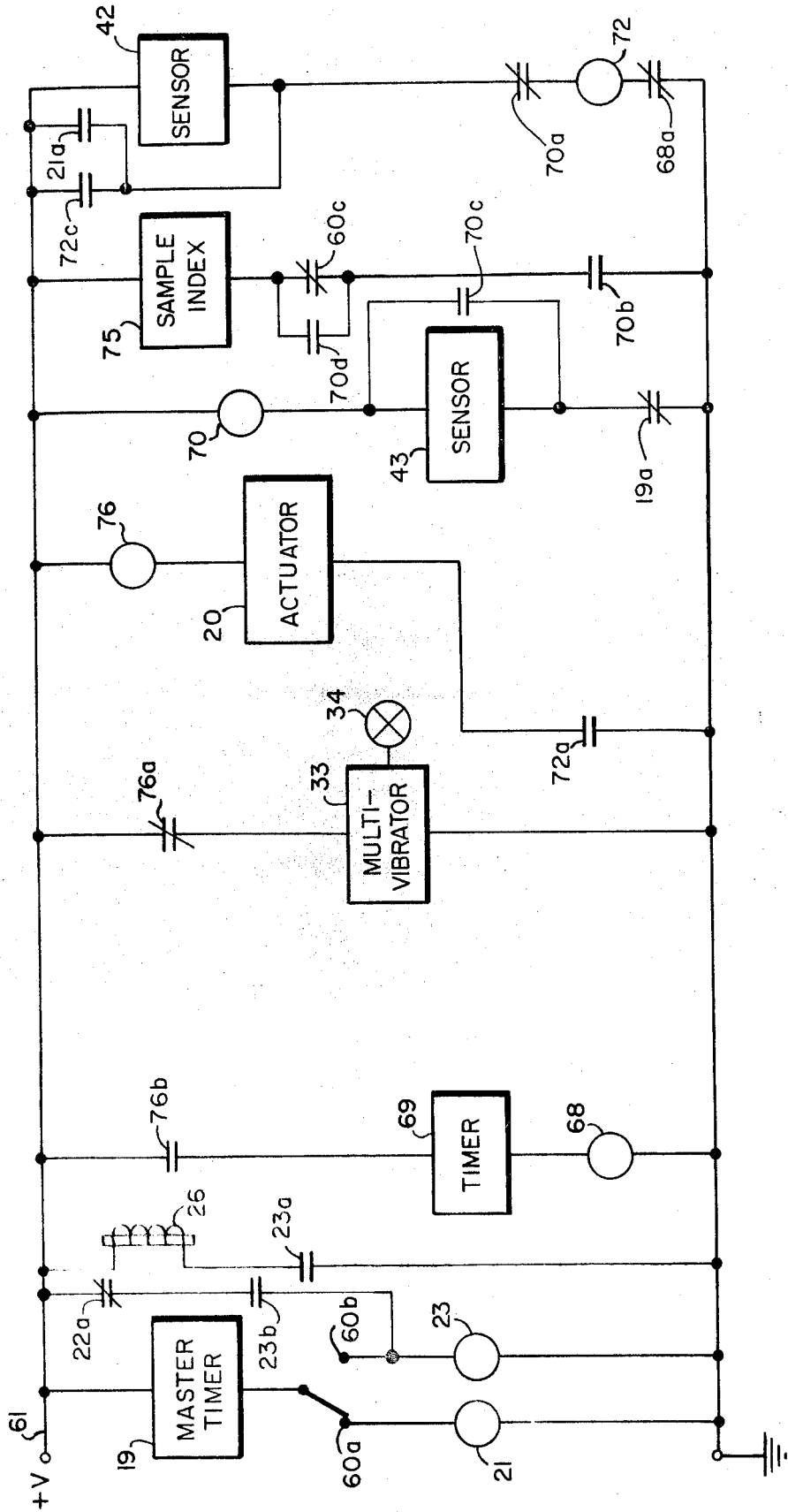
FIG. 3 is an illustration generally partly in schematic and partly block diagrammatic form of a control system operating the elements of the apparatus of FIG. 1 in timed relation.
Figure 4:
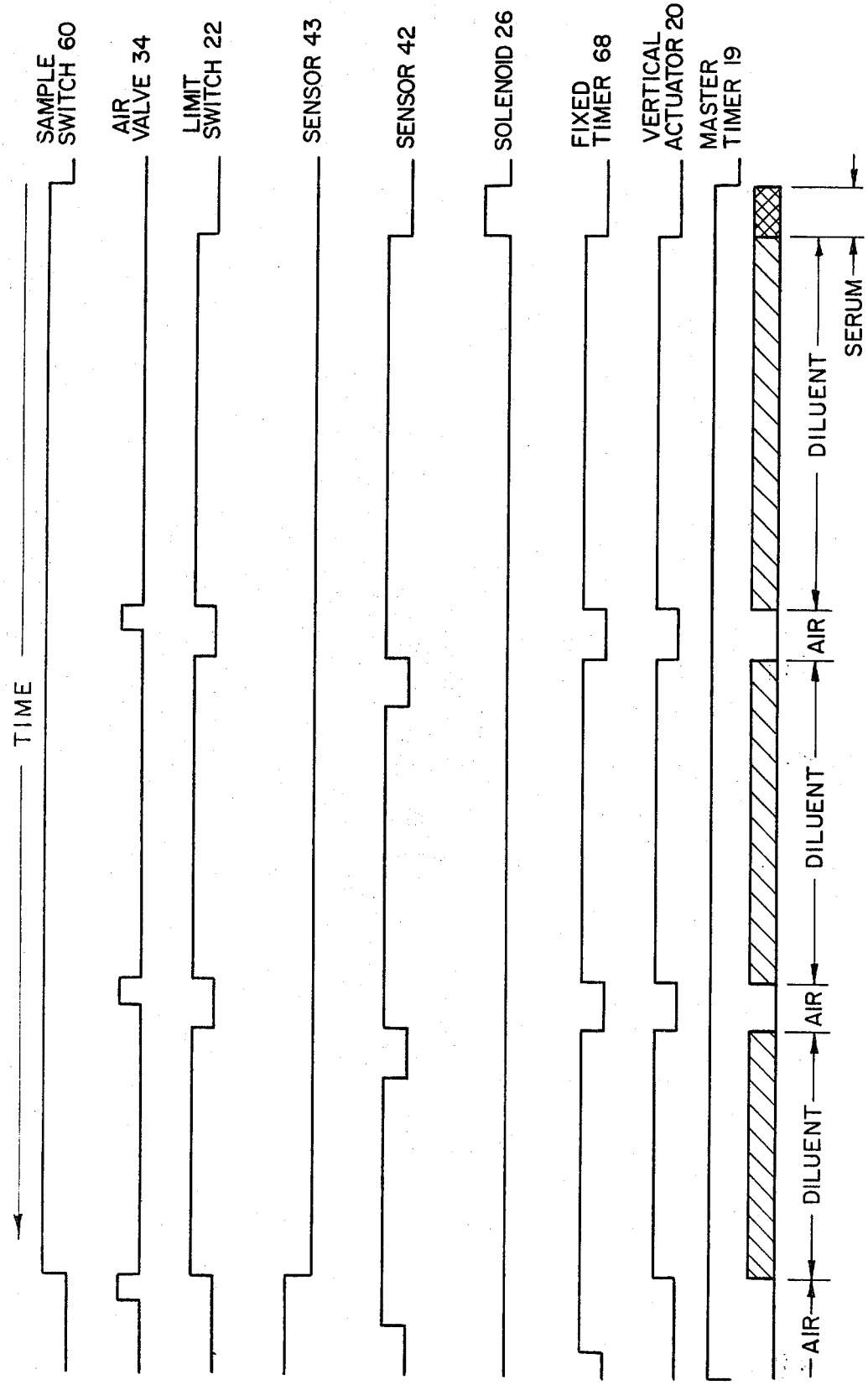
FIG. 4 is a timing diagram of the control system of FIG. 3.

In FIG. 3 there is illustrated a control circuit suitable for use with the apparatus illustrated in FIG. 1. FIG. 4 is a timing diagram of the state of operation of a number of the elements within the control circuit of FIG. 3. In order to establish the significance of the time spacing, a typical column of fluid, in the order in which it flows along through the tubing of the intake section, is shown. The time relationship between the actuation of the various elements and the column of sample fluids in the conduit corresponds to each portion of the fluids being at the probe tip 12a of the input probe 12. While the control circuit is illustrated in terms of a number of relays as the switching elements, it will be understood that the same functions may be performed in a variety of ways, solid state logic elements and pneumatic or hydraulic control elements being other suitable examples.

In the circuit of FIG. 3, a positive voltage supply +V is connected to positive bus 61. A master timer 19 is connected from bus 61 to the arm of single pole double throw switch 60. This switch is normally in the position shown connected to contact 60a and is moved to contact 60b only when a sample container 24 is positioned beneath the probe 12. Relay 21 is connected between contact 60a and ground, while relay 23 is connected between contact 60b and ground. Master timer 19 is a timer having a cycle somewhat longer than the maximum time required to aspirate the sample and all of the increments of diluent. This timer provides an output pulse at the beginning of its period to energize either relay 21 or relay 23 depending upon the position of sample switch 60. Relay 23 is latched through its own normally open contact 23b and normally closed contacts 22a of limit switch 22. The coil of the stop solenoid 26 is connected from the positive bus 61 through contacts 23a of relay 23 to ground.

A timing element 69, which would usually take the form of an adjustable one-shot multivibrator is connected between ground and positive bus 61 through a normally open relay contacts 76b The timer is arranged, so that, when energized, it provides an electrical signal for the duration of the multivibrator pulse and once this period has timed out the relay 68 is energized. The contacts 72a of relay 72 are in series with the actuator 20, which controls the vertical position of the probe 12 and which has its other terminal connected to positive bus 61 through the coil of relay 76. When, as in the present instance, the actuator is a pneumatic element, the electrical control is provided by means of a solenoid operated air valve. The coil of relay 70 is energized by output signals from sensor 43, which provides energy to the solenoid in response to the arrival of an air fluid interface at the position in tubing 30 adjacent to the location of this sensor. A set of normally closed contacts 19a in series with the sensor 43 are momentarily opened by the master timer to permit relay 70 to unlatch. A second set of contacts 70b, controlled by this same relay 70, are in series with a sample index motor 75 through the normally closed contacts 60c of the switch 60. A set of contacts 70d, which close momentarily on actuation of relay 70 are in parallel with the contacts 60c. The sample index motor 75, indexes the sample containers 24 in response to the closure of the contacts 70b and 70d.

A relay 72 having a pair of contacts 72a which controls the actuator 20 is energized by output signals from sensor 42, which is located adjacent to conduit 15. When relay 72 is energized the contacts 72a provide an electrical path to energize the actuator 20. The relay 72 is latched through its own normally open contacts 72c or through the contacts 21a of relay 21. Air valve 34 is controlled by a one-shot multivibrator 33, which has an adjustable period. This multivibrator 33 is energized by the relay contacts 76a, which are operated by relay coil 76, which is in series with actuator 20 and is therefore energized whenever the actuator 20 is energized. Hence the contacts 76a are normally closed and open only when the actuator 20 is not energized, corresponding to the probe 12 being in the lower or intermediate position. Accordingly when contacts 76a open the valve 34 opens only for the duration of the multivibrator pulse.

The operation sequence of this control circuit and the apparatus illustrated in FIG. 1, to produce the fluid train shown in FIG. 4 is as follows. At the beginning of a cycle of the master timer 19, the probe 12 is at the intermediate position with the arm 26a of stop solenoid 26 extended to intercept the projecting arm 27 on the probe 12. The probe is aspirating air and the entire intake section contains only air. If a sample container 24 is positioned under probe 12 the sample switch 60 is connected to contact 60b. The signal from master timer 19 energizes relay 23, closing contacts 23a and energizing stop solenoid 26 withdrawing the arm 26a and allowing the probe 12 to descend to its lower limits with the probe tip 12a immersed in the serum sample and aspirating sample through orifices 48. The operation of relay 23 closes contacts 23b and latches relay 23 through normally closed contacts 22a of the limit switch 22. The serum sample continues to be aspirated until the leading edge of the fluid increment in tube 15 reaches the position adjacent to sensor 42, corresponding to the precise volume of sample to be drawn into the system.

The signal from sensor 42 then energizes relay 72 through normally closed contacts 70a of relay 70 and the normally closed contacts 68a of relay 68, and actuator 20 is now energized through normally open contacts 72a of relay 72 raising the probe 12 into its uppermost position where it aspirates diluent. Since it is in the upper position, the limit switch contacts 22a is opened. The opening of contacts 22a unlatches relay 23 which interrupts the energization of stop solenoid 26 through contacts 23a allowing the arm 26a to return to its extended position where it can interrupt the descent of the probe 12. Further energization of the stop solenoid 26 is prevented by the unlatching of relay 23 until an initial pulse from master timer 19 again energizes relay 23 and causes the closing of contacts 23a. The closure of relay contacts 76b when the probe 12 is actuated initiates the action of timer 69 to provide a time delay for the operation of relay 68. When relay 68 operates it momentarily opens the contacts 68a, dropping out relay 72 which releases the actuator and allows the probe 12 to drop into air and is held by arm 26a. The timer 69 is arranged to have a duration such that the initial increment of diluent aspirated will be somewhat greater than one third the total volume required to obtain the precise volumetric ratio desired.

The deenergizing of relay 76 when the actuator is deenergized allows contacts 76a to close, firing multivibrator 33, opening the air valve 34 momentarily to permit a small quantity of air to be inserted into the tubing 30. The probe 12 remains in this position, aspirating air, until the diluent-air interface arrives at the position of the first sensor 42. Sensor 42 detects the arrival of the diluent-air interface, and provides an output signal which energizes solenoid 72, again energizing the actuator 20 and raising the probe 12 to the upper position. Energization of actuator 20 also energizes relay 76, opening contacts 76a and resetting the multivibrator 33.

When the actuator 20 is energized, contacts 76b of relay 76 close to start timer 69 on its timing cycle. The probe 12, therefore, remains in this upper position aspirating diluent until the timer 69 times out momentarily opening contacts 68a which allows the actuator 20 to become deenergized lowering the probe again to the intermediate position, so that air is aspirated through the probe tip 12a into the probe and conduit 15 and also energizing valve 34 to produce a pulse of air through air intake 33 to equalize pressure and prevent acceleration of the fluid column. The probe 12 remains in the intermediate position until this second diluent-air interface is detected by sensor 42, which event again initiates a raising of probe 12 commencing another cycle of diluent aspiration. This final cycle is terminated, however, not by the timing out of timer 69, but rather by the arrival at sensor 43 of the leading edge of the fluid column, that is the leading edge of the serum sample. The sensor 43 detects this interface and energizes relay 70 opening contacts 70a and closing contacts 70c. This latter contact closure latches relay 70 and it remains latched until the master timer opens the master timer contacts in series with sensor 43. Contacts 70a open the electrical path supplying energy to relay 72 allowing the probe 12 to descend to the intermediate position and aspirate air, once again accompanied by the insertion of a pulse of air through valve 34 into tube 30. The closure of contacts 70b energizes the sample index motor 75 through momentarily closed contacts 70d. The contacts 70d are in parallel with normally closed contacts 60c of the switch 60. The contacts 60c are open because of the presence of a container. As soon as the motor starts and the container 24 moves away, the contacts 60c close and the motor continues to operate until the next container in line operates switch 60, stopping the motor. When the time cycle of master timer 19 is completed it commences the next cycle by supplying an energizing signal pulse through switch 60.

The cycle of operation is somewhat different when there is no sample container 24 positioned under the sample probe 12. In this circumstance the arm of switch 60 remains connected to contact 60a and the initial signal pulse energizes relay 21 and also opens the path to relay 70, stopping the sample index motor. The resultant closure of contacts 21a energizes relay 72 and thereby actuator 20, so that the probe 12 is initially raised to the diluent aspirating position. When the air-diluent interface reaches sensor 42, the relay 72 is already latched so nothing happens and diluent aspiration continues in accordance with the normal cycle. Thus, operation of the actuator causes operation of relay 76 which in turn starts operation of timer 69. When timer 69 times out, it operates relay 68 causing de-energization of relay 72 and the cycle continues as described above.

Thus, this cycle provides continuous washing of the intake section with diluent and air increments when no samples are being processed. By precise positioning of sensor 43, the volumetric ratio of sample to diluent can be precisely maintained since the air increments are measured to be equal to the sample volume and hence can be precisely taken into account in calculating the total volume of diluent contained between the probe tip 12a and sensor 43.

We claim:

1. Apparatus for aspirating a predetermined volume of liquid samples from a container into an intake conduit together with a quantity of diluent having a predetermined volumetric ratio to the volume of said sample comprising, a chamber containing said diluent, said chamber being vertically displaced from the position of said container;

a vertically reciprocable probe having an open aspirating tip, said probe being vertically reciprocable to a first position in which said tip is within the fluid sample in said container and to a second position in which said tip is within said diluent chamber, said probe being reciprocable to a third position intermediate said first and second positions and in which said probe tip is in air;

pump means coupled through said conduit to said probe, continuously maintaining a sub-atmospheric pressure within said conduit and probe;

an air intake device disposed on said conduit downstream from said probe providing, in response to actuating control signals, the intake of air at said downstream position;

a first fluid sensor positioned on said conduit at a point removed from the open aspirating tip of said probe such that the volume between said first sensor and said tip has a predetermined value, said first sensor providing output signals in response to air-fluid interfaces;

control means responsive in part to said first sensor output signal for vertically reciprocating said probe by providing control signals to move said probe to its first position for a period sufficient to aspirate a predetermined volume of sample from said container and to move said probe to its second position to aspirate a quantity of diluent having a predetermined volumetric ratio to the predetermined volume of sample and to move said probe to its third position when said volumes of diluent and sample have been aspirated, said control means providing an actuating control signal to said downstream air intake device whenever said aspirating probe tip is in its third position, the position of said intake device and the timing of said control means being arranged such that air is inserted into said conduit at a position downstream from the leading edge of said fluid sample.

2. Apparatus in accordance with claim 1 wherein said control means is programmed to operate said probe according to the sequential steps of:

first, aspirating said predetermined volume of sample from said container, second, aspirating a first quantity of diluent substantially less than that required to produce said predetermined volumetric ratios, third, aspirating a quantity of air equal to said predetermined volume of sample, fourth, aspirating a second quantity of diluent, the total volume of the first aspirated quantity of diluent and the second aspirated quantity of diluent being less than that required to obtain said predetermined volumetric ratio, fifth, aspirating a quantity of air equal to said predetermined volume of sample, and sixth, aspirating a quantity of diluent such that added to said first and second aspirated quantities of diluent, the total quantity of diluent aspirated is equal to the volume required to obtain said predetermined volumetric ratio.

3. Apparatus in accordance with claim 2 wherein said control unit provides control signals to said air intake device at the conclusion of each period of aspirating diluent.

4. Apparatus for aspirating a predetermined volume of liquid samples from a container into an intake conduit together with a quantity of diluent having a predetermined volumetric ratio to the volume of said sample comprising, a chamber containing said diluent, said chamber being disposed vertically above the position of said container;

a vertically reciprocable probe having an open aspirating tip, said probe being vertically reciprocable to a lowermost position in which said tip is within the fluid sample in said container and to an uppermost position in which said tip is within said diluent chamber, said probe being reciprocable to a position intermedate said lowermost and uppermost positions, wherein said probe tip is in air;

pump means coupled through said conduit to said probe, continuously maintaining a sub-atmospheric pressure within said conduit and probe;

an air intake device disposed on said conduit downstream from said probe providing, in response to actuating control signals, the intake of air at said downstream position;

a first fluid sensor positioned on said conduit at a point removed from the open aspirating tip of said probe such that the volume between said first sensor and said tip has a predetermined value, said first sensor providing output signals in response to air-fluid interfaces;

control means responsive in part to said first fluid sensor output signals for vertically reciprocating said probe by providing control signals to move said probe to its lowermost position for a period sufficient to aspirate a predetermined volume of sample from said container and thereafter to move said probe to its uppermost position to aspirate a quantity of diluent having a predetermined volumetric ratio to the aspirated volume of sample, and to move said probe to its intermediate position when said predetermined volume of diluent has been aspirated, said control means providing an actuating signal to said downstream air intake device whenever said aspirating probe tip is in its intermediate position, the position of said intake device and the timing of said control means being arranged such that air is inserted into said conduit at a position downstream from the leading edge of said fluid sample.

5. Apparatus in accordance with claim 4 wherein said control means is programmed to reciprocate said probe to perform the following sequential steps;

first, to aspirate a predetermined volume of sample from said container, second, to aspirate a first quantity of diluent substantially less than that required to obtain said predetermined volumetric ratio, third, to aspirate a volume of air equal to said predetermined volume of sample, fourth, to aspirate a second quantity of diluent, the total of said first aspirated quantity of diluent and said second aspirated quantity of diluent being less than that required to obtain said predetermined volumetric ratio, fifth, aspirating a volume of air equal to said predetermined volume of sample, and sixth, aspirating a quantity of diluent such that when added to said first and second aspirated quantities of diluent the total quantity of aspirated diluent provides said predetermined volumetric ratio.

6. Apparatus in accordance with claim 5 wherein said control means includes a sensing element for determining whether a container is positioned beneath said vertically reciprocable probe, said sensing element providing an output signal when there is no container underneath said vertically reciprocable probe, said output signal changing the first step in said sequence such that said probe initially aspirates diluent instead of said predetermined volume of sample, the total amount of diluent aspirated, when there is no container beneath said probe being equal to the quantity of diluent aspirated in the cycle when there is a container beneath said probe plus a volume of diluent equal to the predetermined volume of sample aspirated when a sample container is beneath said probe.

7. Apparatus in accordance with claim 5 and further including a second fluid sensor positioned on said conduit downstream from said first sensor, the total volume between said aspirating probe tip and second sensor being equal to four times said predetermined volume of sample plus the volume of diluent required to obtain said predetermined volumetric ratio.

8. Apparatus in accordance with claim 5 wherein said vertically reciprocable probe is energized by an actuating means providing a force in a downward direction in response to one actuating signal and a force in an upward direction in response to a different actuating signal and further including a stop means movable into and out of the path of travel of said reciprocable probe whereby when said stop means is out of said path, said probe extends to its lowermost position in response to a signal providing a downward force and when said stop means is inserted into the path of said probe, said probe is driven to its intermediate position in response to a signal providing a downward force on said probe.

9. Apparatus in accordance with claim 8 wherein said first quantity of diluent is determined by aspirating diluent for a preset time, and said second quantity of diluent is determined by aspirating diluent for the same preset period of time, and wherein at the conclusion of each of said preset periods of time said probe is lowered to its intermediate position.

References Cited
UNITED STATES PATENTS

| | | | |
|---|---|---|---|
| 3,607,094 | 9/1971 | Beer | 23—259 X |
| 3,687,632 | 8/1972 | Natelson | 23—253 X |

MORRIS O. WOLK, Primary Examiner

R. E. SERWIN, Assistant Examiner

U.S. Cl. X.R.

23—253; 73—425.6; 141—130